(12) United States Patent
Gronowski et al.

(10) Patent No.: US 6,974,851 B2
(45) Date of Patent: Dec. 13, 2005

(54) HALOGEN- AND SULFUR-FREE SHAPED ARTICLES CONTAINING PEROXIDE CURABLE COMPOUNDS OF BUTYL RUBBER

(75) Inventors: Adam Gronowski, Sarnia (CA); Susmita Bhattacharjee, Sarnia (CA); Gabor Kaszas, London (CA)

(73) Assignee: Bayer Inc., Sarnia (CA)

( * ) Notice: Subject to any disclaimer, the term of this patent is extended or adjusted under 35 U.S.C. 154(b) by 155 days.

(21) Appl. No.: 10/436,616

(22) Filed: May 13, 2003

(65) Prior Publication Data
US 2004/0006184 A1    Jan. 8, 2004

(30) Foreign Application Priority Data
May 16, 2002    (CA) .................................. 2386628

(51) Int. Cl.⁷ ............................. C08K 3/34; C08L 9/00; C08F 112/36; C08F 236/00; C08C 19/00
(52) U.S. Cl. .................. 525/332.5; 524/571; 524/492; 524/495; 525/332.2; 526/282; 526/336; 526/339
(58) Field of Search ................ 524/571, 492, 524/495; 525/332.2, 332.5; 526/282, 336, 526/339

(56) References Cited

U.S. PATENT DOCUMENTS 3,584,080 A    6/1971    Walker et al ............... 260/889
3,763,131 A * 10/1973   Langer ........................ 585/17

FOREIGN PATENT DOCUMENTS

| CA | 2316741   | 2/2002 |
|----|-----------|--------|
| EP | 0 376 227 | 7/1990 |
| EP | 0 474 406 | 3/1992 |
| GB | 898670    | 6/1962 |
| JP | 6-107738  | 4/1994 |
| JP | 6-172547  | 6/1994 |
| WO | 02/16452  | 2/2002 |

OTHER PUBLICATIONS

George Odian, "Principles of Polymerization", 4$^{th}$ edition, p. 384.*

* cited by examiner

Primary Examiner—Fred Teskin
Assistant Examiner—Mei Q. Huang
(74) Attorney, Agent, or Firm—Jennifer R. Seng

(57) ABSTRACT

The present invention relates to a shaped article for high purity applications containing at least one peroxide curable compound containing a substantially gel-free butyl polymer. In another of its aspects, the present invention relates to a sealing material and a medical device containing at least one peroxide-curable compound containing a substantially gel-free butyl polymer. In still another of its aspects, the present invention relates to a fuel cell containing at least one peroxide curable compound containing a substantially gel-free butyl polymer. In still another of its aspects, the present invention relates to halogen-free and sulfur-free shaped articles.

9 Claims, 1 Drawing Sheet

HALOGEN- AND SULFUR-FREE SHAPED ARTICLES CONTAINING PEROXIDE CURABLE COMPOUNDS OF BUTYL RUBBER

FIELD OF THE INVENTION

The present invention relates to a shaped article for high purity applications containing at least one peroxide curable compound containing butyl polymer containing less than 15 wt. % of solid matter insoluble in boiling cyclohexane under reflux for 60 min. In another of its aspects, the present invention relates to a sealing material and a medical device containing at least one peroxide-curable compound containing a butyl polymer containing less than 15 wt. % of solid matter insoluble in boiling cyclohexane under reflux for 60 min. In still another of its aspects, the present invention relates to a fuel cell containing at least one peroxide curable compound containing a butyl polymer containing less than 15 wt. % of solid matter insoluble in boiling cyclohexane under reflux for 60 min. In still another of its aspects, the present invention relates to halogen-free and sulfur-free shaped articles.

BACKGROUND OF THE INVENTION

Butyl rubber is known for its excellent insulating and gas barrier properties. Generally, commercial butyl polymer is prepared in a low temperature cationic polymerization process using Lewis acid-type catalysts, of which a typical example is aluminum trichloride. The process used most extensively employs methyl chloride as the diluent for the reaction mixture and the polymerization is conducted at temperatures on the order of less than −90° C., resulting in production of a polymer in a slurry of the diluent. Alternatively, it is possible to produce the polymer in a diluent which acts as a solvent for the polymer (e.g., hydrocarbons such as pentane, hexane, heptane and the like). The product polymer may be recovered using conventional techniques in the rubber manufacturing industry.

In many of its applications, a butyl rubber is used in the form of cured compounds. Vulcanizing systems usually utilized for butyl rubber include sulfur, quinoids, resins, sulfur donors and low-sulfur high performance vulcanization accelerators. However, sulfur residues in the compound are often undesirable, e.g., they promote corrosion of parts in contact with the compound.

High performance applications of butyl rubber like condenser caps or medical devices require halogen- and sulfur-free compounds. The preferred vulcanization system in this case is based on peroxides since this produces an article free of detrimental residues. In addition, peroxide-cured compounds offer higher thermal resistance and other advantages compared to sulfur-cured materials.

It is well known to those skilled in the art that bromobutyl rubber can be cured with peroxides (e.g., Brydson "Rubber Chemistry", 1978, p. 318). However, the halogen remaining in the cured compound is not desired in some high purity applications like condenser caps. Bromobutyls also contain a high concentration of stabilizers and cure retarders such as epoxidized soybean oil or calcium stearate. These leachable chemicals limit the use of bromobutyl for medical applications.

If peroxides are used for crosslinking and curing of conventional butyl rubbers, the main chains of the rubber degrade and satisfactorily cured products are not obtained.

One way of obtaining peroxide curable butyl rubber is to use a regular butyl rubber with a vinyl aromatic compound like divinylbenzene (DVB) and an organic peroxide, as described in JP-A-107738/1994. Another similar way to obtain a partially crosslinked butyl rubber is to use a regular butyl rubber with an electron withdrawing group-containing polyfunctional monomer (ethylene dimethacrylate, trimethylolpropane triacrylate, N,N'-m-phenylene dimaleimide, etc.) and an organic peroxide, as disclosed in JP-A-172547/1994. The disadvantage of these methods is that the resulting compound is contaminated with the low molecular weight reagents added to induce crosslinking, which did not fully react with the rubber in the solid state. Also, the action of peroxide on the regular butyl rubber may lead to formation of some low molecular weight compounds from the degraded rubber. The final articles based on such compounds may display an undesirable characteristic of leaching out the said low molecular species and accelerated aging.

A preferred approach nowadays is to use a commercial pre-crosslinked butyl rubber such as commercially available Bayer® XL-10000 (or, formerly XL-20 and XL-50) that can be crosslinked with peroxides, e.g., see Walker et al., "Journal of the Institute of the Rubber Industry", 8 (2), 1974, 64–68. XL-10000 is partially crosslinked with divinylbenzene already in the polymerization stage. No peroxides are present during this polymerization process which takes place via a cationic mechanism. This leads to a much 'cleaner' product than the partially crosslinked butyl disclosed in JP-A-107738/1994. In the latter case, the curing has to be continued for sufficiently long time so that both functional groups of the DVB molecules react and are incorporated into polymer chains.

While said commercial pre-crosslinked polymers exhibit excellent properties in many applications, they have a gel content of at least 50 wt. % which sometimes makes the even dispersion of fillers and curatives normally used during vulcanization difficult. This increases the likelihood of under- and over-cured areas within the rubbery article, rendering its physical properties inferior and unpredictable. Also, the Mooney viscosity of this rubber is high, usually 60–70 units (1'+8'@125° C.) which may cause significant processing difficulties, especially in mixing and sheeting stages.

Processability-improving polymers are often added to the pre-crosslinked butyl rubber to overcome some of these problems. Such polymers are particularly useful for improving the mixing or kneading property of a rubber composition. They include natural rubbers, synthetic rubbers (for example, IR, BR, SBR, CR, NBR, IIR, EPM, EPDM, acrylic rubber, EVA, urethane rubber, silicone rubber, and fluororubber) and thermoplastic elastomers (for example, of styrene, olefin, vinyl chloride, ester, amide, and urethane series). These processability-improving polymers may be used in the amount of up to 100 parts by weight, preferably up to 50 parts by weight, and most preferably up to 30 parts by weight, per 100 parts by weight of a partially crosslinked butyl rubber. However, the presence of other rubbers dilutes said desirable properties of butyl rubber.

Co-pending Canadian Application CA-2,316,741 discloses terpolymers of isobutylene, isoprene, divinyl benzene (DVB) prepared in the presence of a chain-transfer agent, such as diisobutylene, which are substantially gel-free and have an improved processability. However, the above application is silent about peroxide curing and high purity applications.

SUMMARY OF THE INVENTION

The present invention provides a compound containing:

a. at least one elastomeric polymer containing repeating units derived from at least one C4 to C7 isomonoolefin monomer, at least one C4 to C14 multiolefin monomer or β-pinene, at least one multiolefin cross-linking agent and at least one chain transfer agent said polymer containing less than 15 wt. % of solid matter insoluble in boiling cyclohexane under reflux for 60 min, b. at least one filler and c. a peroxide curing system useful for the manufacture of shaped articles for high purity applications.

Another aspect of the invention is a vulcanized rubber part useful for high purity applications.

Yet another aspect of the invention is a condenser cap containing said substantially gel-free peroxide-curable compound interposed between said dynamic means and said static structure at said point of connection.

Yet another aspect of the invention is a medical device containing said substantially gel-free peroxide-curable compound.

DETAILED DESCRIPTION OF THE INVENTION

Figure 1:
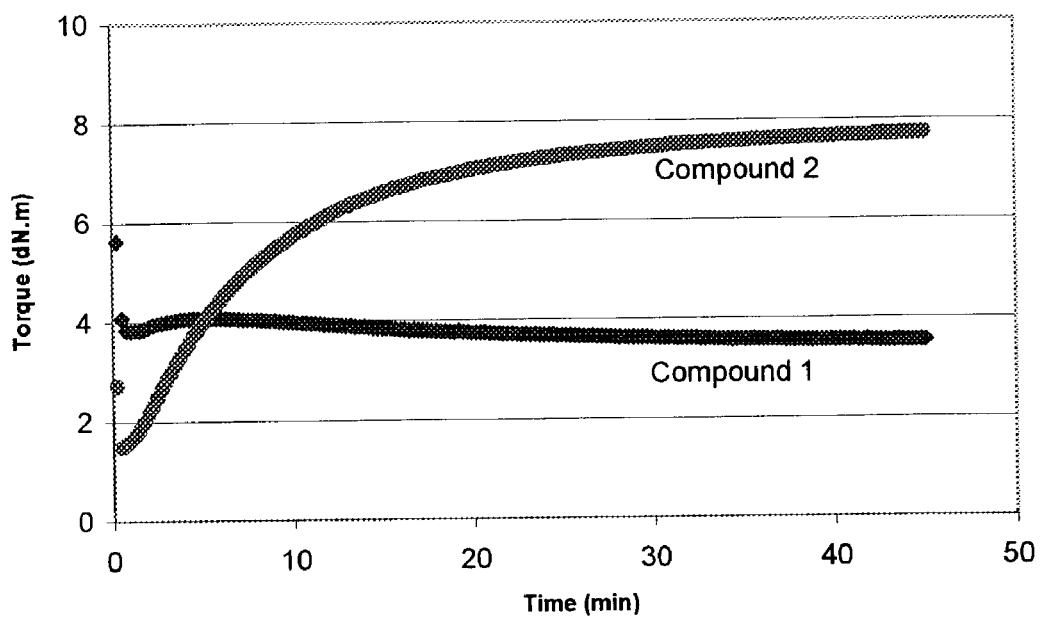
FIG. 1 is a plot of a Moving Die Rheometer test of a commercially available butyl polymer and of a polymer of the present invention.

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

The present invention relates to butyl rubber polymers. The terms "butyl rubber", "butyl polymer" and "butyl rubber polymer" are used throughout this specification interchangeably. While the prior art in using butyl rubber refers to polymers prepared by reacting a monomer mixture containing a C4 to C7 isomonoolefin monomer and a C4 to C14 multiolefin monomer or β-pinene, this invention specifically relates to elastomeric polymers containing repeating units derived from at least one C4 to C7 isomonoolefin monomer, at least one C4 to C14 multiolefin monomer or β-pinene, at least one multiolefin cross-linking agent and at least one chain transfer agent. The butyl polymer of this invention would be preferentially non-halogenated.

In connection with this invention the term "substantially gel-free" is understood to denote a polymer containing less than 15 wt. % of solid matter insoluble in cyclohexane (under reflux for 60 min), preferably less than 10 wt. %, in particular less than 5 wt. %.

In connection with this invention the term "sulfur free" and "halogen free" is understood to denote polymers containing residual amounts of sulfur and halogen, preferably less than 1 wt. %

The present invention is not restricted to any particular C4 to C7 isomonoolefin monomers. Preferred C4 to C7 monoolefins are isobutylene, 2-methyl-1-butene, 3-methyl-1-butene, 2-methyl-2-butene, 4-methyl-1-pentene and mixtures thereof The most preferred C4 to C7 isomonoolefin monomer is isobutylene.

Furthermore, the present invention is not restricted to any particular C4 to C14 multiolefin. However conjugated or non-conjugated C4 to C14 diolefins are particularly useful. Preferred C4 to C14 multiolefin monomers are isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene or mixtures thereof The most preferred C4 to C14 multiolefin monomer is isoprene.

Even more, the present invention is not restricted to any particular multiolefin cross-linking agent. Preferably, the multiolefin cross-linking agent is a multiolefinic hydrocarbon compound. Examples of these are norbornadiene, 2-isopropenylnorbornene, 5-vinyl-2-norbornene, 1,3,5-hexatriene, 2-phenyl-1,3-butadiene, divinylbenzene, diisopropylbenzene, divinyltoluene, divinylxylene or C1 to C20 alkyl-substituted derivatives of the above compounds. More preferably, the multiolefin crosslinking agent is divinylbenzene, diisopropenylbenzene, divinyltoluene, divinylxylene or C1 to C20 alkyl substituted derivatives of said compounds. Most preferably the multiolefin crosslinking agent is divinylbenzene or diisopropylbenzene.

As it will be apparent to the skilled in the art, the chemical formula for preferred multiolefin monomers and multiolefin cross-linking agents overlap. The skilled in the art will appreciate that the difference between these compounds is a functional one. While a monomer is prone to propagating the chain in one dimension, a cross-linking agent will be prone to reacting with two or more chains instead. The determination of whether a chemical compound reacts under the given conditions as a cross-linking agent or as a monomer is easily, unmistakably and directly made through some very limited preliminary experiments. While an increase in concentration of cross-linking agent will result in a directly related increase in cross-linking density in the polymer, an increase in concentration of a monomer will usually not affect the cross-linking density in the same way. Preferable multiolefin monomers will not result in crosslinking if present in an amount of up to 5 mol % in the reaction mixture.

Even more, the present invention is not restricted to any particular chain transfer agent. However, the chain transfer agent should preferably be a strong chain transfer agent—i.e., it should be capable of reacting with the growing polymer chain, terminate its further growth and subsequently initiate a new polymer chain. The type and amount of chain transfer agent is dependent upon the amount of crosslinking agent. At low concentrations of crosslinking agent low amounts of chain transfer agent and/or a weak chain transfer agent can be employed. As the concentration of the crosslinking agent is increased, however, the chain transfer agent concentration should be increased and/or a stronger chain transfer agent should be selected. Use of a weak chain transfer agent should be avoided because too much can decrease the polarity of the solvent mixture and also would make the process uneconomical. The strength of the chain transfer agent may be determined conventionally—see, for example, J. Macromol. Sci.-Chem., A1(6) pp. 995–1004 (1967). A number called the transfer constant expresses its strength. According to the values published in this paper, the transfer constant of 1-butene is 0. Preferably, the chain transfer agent has a transfer coefficient of at least 10, more preferably at least 50. Non-limiting examples of useful chain transfer agents are piperylene, 1-methylcycloheptene, 1-methyl-1-cyclopentene, 2-ethyl-1-hexene, 2,4,4-trimethyl-1-pentene, indene and mixtures thereof The most preferred chain transfer agent is 2,4,4-trimethyl-1-pentene.

Preferably, the monomer mixture to be polymerized comprises in the range of from 65% to 98.98% by weight of at least one C4 to C7 isomonoolefin monomer, in the range of from 1.0% to 20% by weight of at least one C4 to C14 multiolefin monomer or β-pinene, in the range of from 0.01% to 15% by weight of a multifunctional cross-linking agent, and in the range of from 0.01% to 10% by weight of a chain-transfer agent. More preferably, the monomer mixture comprises in the range of from 72% to 98.9% by weight of a C4 to C7 isomonoolefin monomer, in the range of from 1.0% to 10% by weight of a C4 to C14 multiolefin monomer or β-pinene, in the range of from 0.05% to 10% by weight of a multifunctional cross-linking agent, and in the range of from 0.05% to 8% by weight of a chain-transfer agent. Most preferably, the monomer mixture comprises in the range of from 85% to 98.85% by weight of a C4 to C7 isomonoolefin monomer, in the range of from 1.0% to 5% by weight of a C4 to C14 multiolefin monomer or β-pinene, in the range of from 0.1% to 5% by weight of a multifunctional cross-linking agent, and in the range of from 0.05% to 5% by weight of a chain-transfer agent. It will be apparent to the skilled in the art that the total of all monomers will result in 100% by weight.

The monomer mixture may contain minor amounts of one or more additional polymerizable co-monomers. For example, the monomer mixture may contain a small amount of a styrenic monomer like p-methylstyrene, styrene, α-methylstyrene, p-chlorostyrene, p-methoxystyrene, indene (including indene derivatives) and mixtures thereof. If present, it is preferred to use the styrenic monomer in an amount of up to 5.0% by weight of the monomer mixture. The values of the C4 to C7 isomonoolefin monomer(s) and/or the C4 to C14 multiolefin monomer(s) or β-pinene will have to be adjusted accordingly to result again in a total of 100% by weight.

The use of even other monomers in the monomer mixture is possible, provided, of course, that they are copolymerizable with the other monomers in the monomer mixture.

The present invention is not restricted to a special process for preparing/polymerizing the monomer mixture. This type of polymerization is well known to the skilled in the art and usually comprises contacting the reaction mixture described above with a catalyst system. Preferably, the polymerization is conducted at a temperature conventional in the production of butyl polymers—e.g., in the range of from –100° C. to +50° C. The polymer may be produced by polymerization in solution or by a slurry polymerization method. Polymerization is preferably conducted in suspension (the slurry method)—see, for example, Ullmann's Encyclopedia of Industrial Chemistry (Fifth, Completely Revised Edition, Volume A23, Editors Elvers et al., 290–292).

The inventive polymer preferably has a Mooney viscosity ML (1+8@125° C.) in the range of from 5 to 40 units, more preferably in the range of from 7 to 35 units.

As an example, in one embodiment the polymerization is conducted in the presence of an inert aliphatic hydrocarbon diluent (such as n-hexane) and a catalyst mixture containing a major amount (in the range of from 80 to 99 mole percent) of a dialkylaluminum halide (for example diethylaluminum chloride), a minor amount (in the range of from 1 to 20 mole percent) of a monoalkyl-aluminum dihalide (for example isobutylaluminum dichloride), and a minor amount (in the range of from 0.01 to 10 ppm) of at least one of a member selected from the group containing water, aluminoxane (for example methylaluminoxane) and mixtures thereof. Of course, other catalyst systems conventionally used to produce butyl polymers can be used to produce a butyl polymer which is useful herein—see, for example, "Cationic Polymerization of Olefins: A Critical Inventory" by Joseph P. Kennedy (John Wiley & Sons, Inc. © 1975, 10–12).

Polymerization may be performed both continuously and discontinuously. In the case of continuous operation, the process is preferably performed with the following three feed streams:

I) solvent/diluent+isomonoolefin(s) (preferably isobutene)
II) multiolefin(s) (preferably diene, isoprene), multifunctional cross-linking agent(s) and chain-transfer agent(s)
III) catalyst In the case of discontinuous operation, the process may, for example, be performed as follows: The reactor, pre-cooled to the reaction temperature, is charged with solvent or diluent and the monomers. The initiator is then pumped in the form of a dilute solution in such a manner that the heat of polymerization may be dissipated without problem. The course of the reaction may be monitored by means of the evolution of heat.

The compound further comprises at least one active or inactive filler. The filler may be in particular:

highly dispersed silicas, prepared e.g. by the precipitation of silicate solutions or the flame hydrolysis of silicon halides, with specific surface areas of in the range of from 5 to 1000 m2/g, and with primary particle sizes of in the range of from 10 to 400 nm; the silicas can optionally also be present as mixed oxides with other metal oxides such as those of Al, Mg, Ca, Ba, Zn, Zr and Ti, synthetic silicates, such as aluminum silicate and alkaline earth metal silicate like magnesium silicate or calcium silicate, with BET specific surface areas in the range of from 20 to 400 m2/g and primary particle diameters in the range of from 10 to 400 nm;

natural silicates, such as kaolin and other naturally occurring silica;

glass fibers and glass fiber products (matting, extrudates) or glass micro spheres, metal oxides, such as zinc oxide, calcium oxide, magnesium oxide and aluminum oxide;

metal carbonates, such as magnesium carbonate, calcium carbonate and zinc carbonate;

metal hydroxides, e.g. aluminum hydroxide and magnesium hydroxide, carbon blacks; the carbon blacks to be used here are prepared by the lamp black, furnace black or gas black process and have preferably BET (DIN 66 131) specific surface areas in the range of from 20 to 200 m2/g, e.g. SAF, ISAF, HAF, FEF or GPF carbon blacks;

rubber gels, especially those based on polybutadiene, butadiene/styrene copolymers, butadiene/acrylonitrile copolymers and polychloroprene;

or mixtures thereof.

Examples of preferred mineral fillers include silica, silicates, clay such as bentonite, gypsum, alumina, titanium dioxide, talc, mixtures of these, and the like. These mineral particles have hydroxyl groups on their surface, rendering them hydrophilic and oleophobic. This exacerbates the difficulty of achieving good interaction between the filler particles and the tetrapolymer. For many purposes, the preferred mineral is silica, especially silica made by carbon dioxide precipitation of sodium silicate. Dried amorphous silica particles suitable for use in accordance with the invention may have a mean agglomerate particle size in the range of from 1 to 100 microns, preferably between 10 and 50 microns and most preferably between 10 and 25 microns. It is preferred that less than 10 percent by volume of the agglomerate particles are below 5 microns or over 50 microns in size. A suitable amorphous dried silica moreover usually has a BET surface area, measured in accordance with DIN (Deutsche Industrie Norm) 66131, of in the range of from 50 and 450 square meters per gram and a DBP absorption, as measured in accordance with DIN 53601, of in the range of from 150 and 400 grams per 100 grams of silica, and a drying loss, as measured according to DIN ISO 787/11, of in the range of from 0 to 10 percent by weight. Suitable silica fillers are available under the trademarks HiSil® 210, HiSil® 233 and HiSil® 243 from PPG Industries Inc. Also suitable are Vulkasil® S and Vulkasil® N. from Bayer AG.

It might be advantageous to use a combination of carbon black and mineral filler in the inventive compound. In this combination the ratio of mineral fillers to carbon black is usually in the range of from 0.05 to 20, preferably 0.1 to 10. For the rubber composition of the present invention it is usually advantageous to contain carbon black in an amount of in the range of from 20 to 200 parts by weight, preferably 30 to 150 parts by weight, more preferably 40 to 100 parts by weight.

The compound further comprises at least one peroxide curing system. The invention is not limited to a special peroxide curing system. For example, inorganic or organic peroxides are suitable. Preferred are organic peroxides such as dialkylperoxides, ketalperoxides, aralkylperoxides, peroxide ethers, peroxide esters, such as di-tert-butylperoxide, bis-(tert-butylperoxyisopropyl)-benzene, dicumylperoxide, 2,5-dimethyl-2,5-di(tert-butylperoxy)-hexane, 2,5-dimethyl-2,5-di(tert-butylperoxy)-hexene-(3), 1,1-bis-(tert-butylperoxy)-3,3,5-trimethylcyclohexane, benzoylperoxide, tert-butylcumylperoxide and tert-butylperbenzoate. Usually the amount of peroxide in the compound is in the range of from 1 to 10 phr (=per hundred rubber), preferably from 4 to 8 phr. Subsequent curing is usually performed at a temperature in the range of from 100 to 200° C., preferably 130 to 180° C. Peroxides might be applied advantageously in a polymer-bound form. Suitable systems are commercially available, such as Polydispersion T(VC) D-40 P from Rhein Chemie Rheinau GmbH, D (=polymer-bound di-tert-butylperoxy-isopropylbenzene).

Even if it is not preferred, the compound may further comprise other natural or synthetic rubbers such as BR (polybutadiene), ABR (butadiene/acrylic acid-C1–C4-alkylester-copolymers), CR (polychloroprene), IR (polyisoprene), SBR (styrene/butadiene-copolymers) with styrene contents in the range of 1 to 60 wt. %, NBR (butadiene/acrylonitrile-copolymers with acrylonitrile contents of 5 to 60 wt. %, HNBR (partially or totally hydrogenated NBR-rubber), EPDM (ethylene/propylene/diene-copolymers), FKM (fluoropolymers or fluororubbers), and mixtures of the given polymers.

The rubber composition according to the invention can contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts, which depend inter alia on the intended use. Conventional amounts are e.g. from 0.1 to 50 wt. %, based on rubber. Preferably the composition furthermore comprises in the range of 0.1 to 20 phr of an organic fatty acid, preferably a unsaturated fatty acid having one, two or more carbon double bonds in the molecule which more preferably includes 10% by weight or more of a conjugated diene acid having at least one conjugated carbon-carbon double bond in its molecule. Preferably those fatty acids have in the range of from 8–22 carbon atoms, more preferably 12–18. Examples include stearic acid, palmitic acid and oleic acid and their calcium-, zinc-, magnesium-, potassium- and ammonium salts.

The ingredients of the final compound are mixed together, suitably at an elevated temperature that may range from 25° C. to 200° C. Normally the mixing time does not exceed one hour and a time in the range from 2 to 30 minutes is usually adequate. The mixing is suitably carried out in an internal mixer such as a Banbury mixer, or a Haake or Brabender miniature internal mixer. A two roll mill mixer also provides a good dispersion of the additives within the elastomer. An extruder also provides good mixing, and permits shorter mixing times. It is possible to carry out the mixing in two or more stages, and the mixing can be done in different apparatus, for example one stage in an internal mixer and one stage in an extruder. However, it should be taken care that no unwanted pre-crosslinking (=scorch) occurs during the mixing stage. For compounding and vulcanization see also: Encyclopedia of Polymer Science and Engineering, Vol. 4, p. 66 et seq. (Compounding) and Vol. 17, p. 666 et seq. (Vulcanization).

Furthermore, the invention provides shaped vulcanized rubber parts for high purity applications containing said substantially gel-free peroxide-curable compound. There are many high purity applications for which said rubber parts are suitable, such as containers for pharmaceuticals, in particular stopper and seals for glass or plastic vials, tubes, parts of syringes and bags for medical and non-medical applications, condenser caps and seals for fuel cells, parts of electronic equipment, in particular insulating parts, seals and parts of containers containing electrolytes.

The present invention will be further illustrated by the following examples.

EXAMPLES

Methyl chloride (Dow Chemical) serving as a diluent for polymerization and isobutylene monomer (Matheson, 99%) were transferred into a reactor by condensing a vapor phase. Aluminum chloride (99.99%), isoprene (99%) and 2,4,4-trimethyl-1-pentene (97%) were from Aldrich. The inhibitor was removed from isoprene by using an inhibitor removing disposable column from Aldrich. Commercial divinylbenzene (ca. 64%) was from Dow Chemical.

The mixing of a compound with carbon black (IRB #7) and peroxide (DI-CUP 40C, Struktol Canada Ltd.) was done using a miniature internal mixer (Brabender MIM) from C. W. Brabender, consisting of a drive unit (Plasticorder® Type PL-V151) and a data interface module.

The Mooney viscosity test was carried out according to ASTM standard D-1646 on a Monsanto MV 2000 Mooney Viscometer.

The Moving Die Rheometer (MDR) test was performed according to ASTM standard D-5289 on a Monsanto MDR 2000 (E). The upper die oscillated through a small arc of 1 degree.

The solubility of a polymer was determined after the sample was placed in cylohexane boiling under reflux over 60-minute period.

Example 1

A commercially available butyl polymer (Bayer® Butyl 402, a copolymer of isobutylene and isoprene) was compounded using the following recipe:
Butyl-based polymer: 100 phr
Carbon black (IRB#7): 50 phr
Peroxide: (DI-CUP 40C): 1.0 phr
The mixing was done in a Brabender internal mixer (capacity ca. 75 cc).

The starting temperature was 60° C. and the mixing speed 50 rpm. The following steps were carried out:
0 min: polymer added
1.5 min: carbon black added, in increments
7.0 min: peroxide added
8.0 min: mix removed
The obtained compound (Compound 1) was passed through a mill (6"×12") six times with a tight nip gap.

The compound was subjected to the MDR test to determine cure characteristics. The MDR plot is given in FIG. 1.

Example 2

To a 50 mL Erlenmeyer flask, 0.45 g of AlCl3 was added, followed by 100 mL of methyl chloride at −30° C. The resulting solution was stirred for 30 min at −30° C. and then cooled down to −95° C., thus forming the catalyst solution.

To a 2000 mL glass reactor equipped with an overhead stirrer, 900 mL of methyl chloride at −95° C. were added, followed by 100.0 mL isobutylene at −95° C., 3.0 mL of isoprene at room temperature, 4.0 mL of commercial DVB at room temperature, and 3.0 mL of 2,4,4-trimethyl-1-pentene at room temperature. The reaction mixture was cooled down to −95° C. and 10.0 mL of the catalyst solution was added to start the reaction.

The reaction was carried out in MBRAUN® dry box under the atmosphere of dry nitrogen. The reaction was terminated after 5 minutes by adding into the reaction mixture 10 mL of ethanol containing some sodium hydroxide.

The obtained polymer was steam coagulated and dried on a 6"×12" mill at ca. 105° C. followed by drying in a vacuum oven at 50° C. to a constant weight. The Mooney viscosity of the rubber was 7.5 units (1'+8'@125° C.) and the solubility in cyclohexane was 98.0 wt. %.

The polymer was compounded using the same recipe and methodology given in Example 1. The compound (Compound 2) was subjected to the MDR test to determine cure characteristics. The MDR plot is given in FIG. 1.

The above example demonstrates that the substantially gel-free polymer is peroxide curable, unlike the regular butyl rubber. At the same time, this polymer obtained in the presence of a chain-transfer agent is significantly different from commercial pre-crosslinked polymers in terms of Mooney viscosity and the content of an insoluble fraction.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A shaped vulcanized article for high purity applications comprising at least one compound comprising:
   a. at least one elastomeric polymer comprising repeating units derived from at least one $C_4$ to $C_7$ isomonoolefin monomer, at least one $C_4$ to $C_{14}$ multiolefin monomer, at least one multiolefin cross-linking agent and at least one chain transfer agent, and wherein said polymer comprising less than 15 wt. % of solid matter insoluble in boiling cyclohexane under reflux for 60 min,
   b. at least one filler and
   c. a peroxide curing system;
   wherein the chain transfer agent is selected from 1-methylcycloheptene, 1-methyl-1-cyclopentene, 2-ethyl-1-hexene, 2,4,4-trimethyl-1-pentene, indene or mixtures thereof
   wherein the shaped vulcanized article is halogen-free and sulfur free.

2. An article according to claim 1, wherein in the compound the $C_4$ to $C_7$ isomonoolefin monomer(s) are selected from the group consisting of isobutylene, 2-methyl-1-butene, 3-methyl-1-butene, 2-methyl-2-butene, 4-methyl-1-pentene and mixtures thereof.

3. An article according to claim 1, wherein in the compound the $C_4$ to $C_{14}$ multiolefin monomer(s) are selected from the group consisting of isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopentadiene, methylcyclopentadiene, cyclohexadiene, 1-vinyl-cyclohexadiene and mixtures thereof.

4. An article according to claim 1, wherein in the compound the multiolefin cross-linking agent(s) are selected from the group consisting of norbornadiene, 2-isopropenylnorbornene, 5-vinyl-2-norbornene, 1,3,5-hexatriene, 2-phenyl-1,3-butadiene, divinylbenzene, diisopropenylbenzene, divinyltoluene, divinylxylene and C1 to C20 alkyl-substituted derivatives of the above compounds.

5. An article according to claim 1, wherein in the compound the peroxide system is organic peroxide.

6. An article according to claim 1 in the form of a condenser cap.

7. An article according to claim 1 in the form of a medical device.

8. A medical device comprising an article according to claim 1.

9. A fuel cell comprising an article according to claim 1.

* * * * *